United States Patent [19]
Pipitone

[11] 3,987,254
[45] Oct. 19, 1976

[54] TRANSFORMERLESS AMPLIFICATION CIRCUITRY FOR TELECOMMUNICATION SYSTEM

[75] Inventor: Roberto Pipitone, Milan, Italy

[73] Assignee: Societa Italiana Telecomunicazioni Siemens S.p.A, Milan, Italy

[22] Filed: Mar. 20, 1975

[21] Appl. No.: 560,518

[30] Foreign Application Priority Data
Mar. 21, 1974 Italy .................................. 67891/74

[52] U.S. Cl. ............................. 179/81 B; 179/81 R; 179/170 NC
[51] Int. Cl.² .......................................... H04M 1/00
[58] Field of Search ............... 179/81 R, 81 A, 81 B, 179/170 NC, 170 D, 1 HF, 1 C, 2 C

[56] References Cited
UNITED STATES PATENTS

| | | | |
|---|---|---|---|
| 3,022,379 | 2/1962 | Soderbaum et al. | 179/1 HF |
| 3,027,429 | 3/1962 | Eklov | 179/81 B |
| 3,030,446 | 4/1962 | Briggs | 179/1 HF |
| 3,033,940 | 5/1962 | Cox | 179/81 B |
| 3,784,755 | 1/1974 | Cambridge et al. | 179/81 A |

OTHER PUBLICATIONS
"A New Look At Loudspeaking Telephones," W. Clarke and J. Gale, Telesis, Fall 1973, pp. 79–81.

*Primary Examiner*—Kathleen H. Claffy
*Assistant Examiner*—Randall P. Myers
*Attorney, Agent, or Firm*—Karl F. Ross; Herbert Dubno

[57] ABSTRACT

A two-wire line is connected via a resistive hybrid circuit to a high-impedance output of a transmitter amplifier, carrying outgoing voice signals originating at a microphone, and to a high-impedance input of a receiver amplifier, carrying incoming voice signals destined for an earphone. A biasing network, connected across the line in parallel with the hybrid circuit, includes a pair of cascaded complementary transistors whose collectors are interconnected through a low-ohmic voltage divider supplying operating voltage, balanced with reference to the line voltage, to the transmitter amplifier and delivering a similarly balanced reference voltage to the receiver amplifier.

10 Claims, 3 Drawing Figures

TRANSFORMERLESS AMPLIFICATION CIRCUITRY FOR TELECOMMUNICATION SYSTEM

FIELD OF THE INVENTION

My present invention relates to a circuit arrangement for amplifying incoming and outgoing signals traveling over a two-wire line to a receiver and from a transmitter which are connected across that line in mutually conjugate relationship with the aid of a hybrid coupling.

BACKGROUND OF THE INVENTION

In telecommunication systems, especially in the field of telephony, alternating-current signals such as voice-frequency oscillations are sent over an unbalanced two-wire line as modulations of a direct current normally present on that line in its operating condition, the incoming signals being inductively communicated to a receiver such as an earphone through a so-called hybrid-coil transformer which decouples that receiver from an associated transmitter such as a microphone. Unless the signal-transmitting circuit is properly balanced with reference to the line, its normally unshielded output leads may capacitively pick up stray signals from the adjoining input leads of the receiving circuit which may generate parasitic oscillations on the line loop. Furthermore, the inductive coupling prevents the use of integrated circuitry and consequently requires a relatively bulky and weighty structure. Finally, unavoidable circuit losses (e.g. in a matching impedance) prevent the use of 100% modulation of an available direct current in the signal-transmitting network, which limits the permissible line length between a subscriber station and a central office or a repeater.

In my copending application Ser. No. 560,517 of even date I have disclosed a purely resistive hybrid circuit which can be readily integrated and also provides a symmetrical structure for the suppression of line noise. With such a hybrid circuit it is necessary that, in order to avoid low-resistance shunts, the impedance across the output terminals of the signal-transmitting network and the input terminals of the signal-receiving network be high. The more recently developed electroacoustic transducers with piezoceramic membranes, because of their high sensitivity, are eminently suitable as a microphone and an earphone in a signal-transmitting network and a signal-receiving network of high terminal impedance coupled to the line by such a hybrid circuit.

OBJECTS OF THE INVENTION

An important object of my present invention, therefore, is to provide high-impedance amplifying circuitry for such transducers in a telecommunication system, particularly a telephone system, using a resistive hybrid circuit to couple these networks to a line.

Another object is to provide, in such a system, a transmitting amplifier enabling 100% modulation of a direct current, flowing in the quiescent state of the system, for the purpose of efficient signal transmission permitting the use of longer lines.

SUMMARY OF THE INVENTION

In accordance with my present invention, a biasing network bridged across the two-wire line is connected via first conductor means to first amplifier means in the signal-transmitting network, for supplying thereto an operating voltage substantially balanced with respect to the line voltage, and via second conductor means to second amplifier means in the signal-receiving network for supplying thereto an operating voltage also substantially balanced with respect to the line voltage. A coupling circuit, preferably of the resistive type disclosed in my copending application and described in detail hereinafter, connects a high-impedance output circuit of the signal-transmitting network and a high-impedance input circuit of the signal-receiving network in mutually conjugate relationship across the line.

According to a more particular feature of my invention, the first amplifier means comprises a transistor stage with supply terminals connected by the first conductor means across a low-resistance intermediate section of the biasing network.

According to another feature of my invention, the second amplifier means comprises a differential-amplifier stage whose supply circuit includes a control transistor connected to the second conductor means.

The biasing network may comprise a pair of cascaded complementary transistors with collectors interconnected through a low-ohmic voltage divider, e.g. a series of diodes inserted in the forward direction therebetween, to which the first and second conductor means are tied.

BRIEF DESCRIPTION OF THE DRAWING

The above and other features of my invention will now be described in detail with reference to the accompanying drawing in which.

SPECIFIC DESCRIPTION

Figure 1:
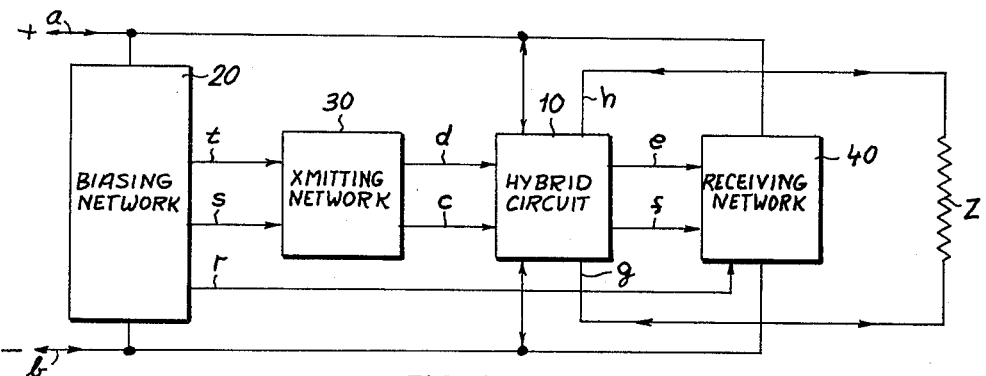
FIG. 1 is a block diagram showing coupling and amplifying circuitry according to this invention as incorporated in a telephone system.

In FIG. 1 I have shown a two-wire line $a$, $b$ extending from a nonillustrated central office to a subscriber station provided with the usual handset including a microphone and an earphone, the former being part of a signal-transmitting network 30 while the latter is part of a signal-receiving network 40. The two networks are connected across line $a$, $b$ by a hybrid circuit 10 via respective conductor pairs $c$, $d$ and $e$, $f$; circuit 10 is also connected, by way of conductors $g$ and $h$, across a matching impedance Z.

In accordance with an important feature of my present invention, a biasing network 20 is connected across the line $a$, $b$ in parallel with hybrid circuit 10 and has a pair of supply conductors $s$, $t$ extending to network 30 as well as a reference conductor $r$ extending to network 40. All these conductors carry voltages in a limited range midway between the potentials of wires $a$ and $b$, the former being more positive than the latter.

Figure 2:
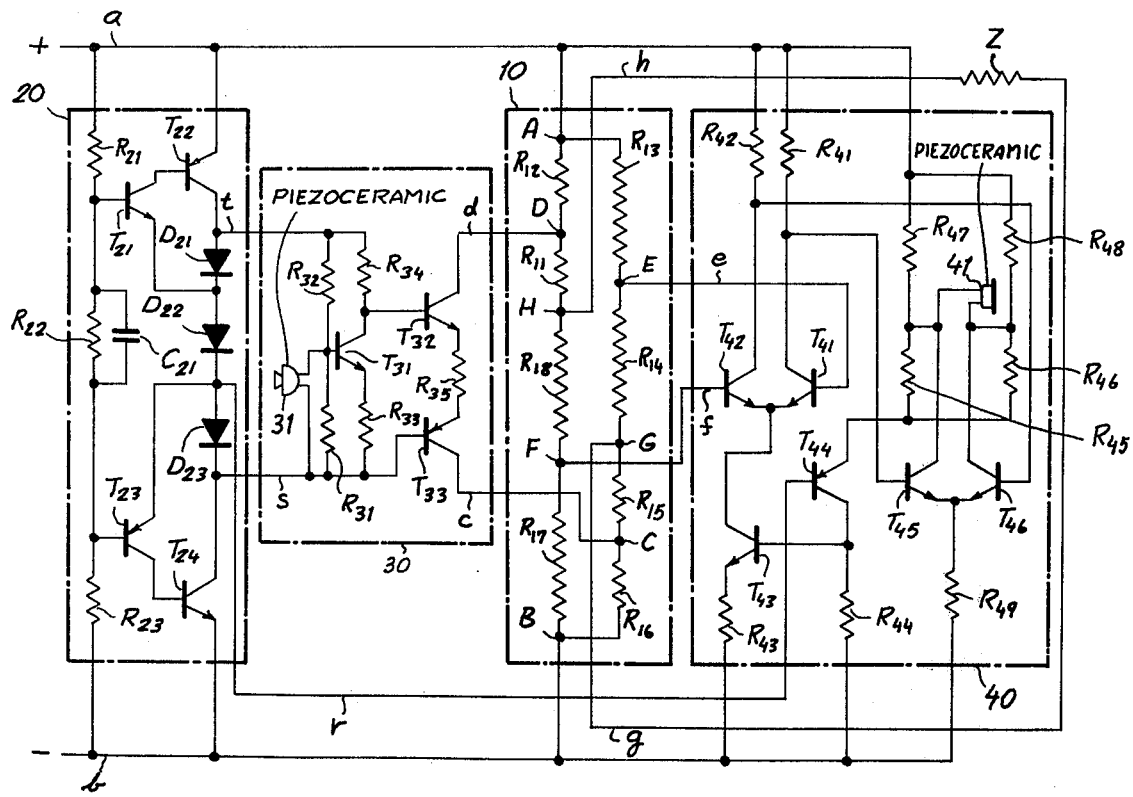
FIG. 2 is a more detailed circuit diagram of the components of FIG. 1.

As more fully illustrated in FIG. 2, circuit 10 comprises a closed loop consisting of eight serially interconnected resistors (or resistance networks) $R_{11} - R_{18}$. As indicated in the drawing by the difference in length, resistors $R_{11}$, $R_{12}$, $R_{15}$ and $R_{16}$ are of the same relatively low magnitude whereas resistors $R_{13}$, $R_{14}$, $R_{17}$ and $R_{18}$ are of identical and relatively high magnitude. The four smaller resistors form respective halves of two opposite arms $R_{11}$, $R_{12}$ and $R_{15}$, $R_{16}$ of a resistance bridge having corners A, B, G and H; the four larger resistors form respective halves of two other opposite arms $R_{13}$, $R_{14}$ and $R_{17}$, $R_{18}$ of the bridge. The midpoints of the low-resistance arms have been designated C, D and form junctions with the conductors $c$ and $d$ extending from the output of transmitting network 30; the midpoints of the high-resistance arms have been designated E, F and form junctions with the conductors $e$ and $f$ extending to the receiving network 40. Corners A and B at the ends of a first bridge diagonal are tied to line wires $a$ and $b$ whereas corners G and H at the ends of a second bridge diagonal form junctions with conductors $g$ and $h$ leading to matching impedance Z.

Biasing network 20 comprises a voltage divider consisting of three serially interconnected resistors $R_{21}$, $R_{22}$, $R_{23}$ bridged across wires $a$ and $b$, the middle resistor $R_{22}$ being shunted by a capacitor $C_{21}$. The mutually symmetrical junctions of resistor $R_{22}$ with resistors $R_{21}$ and $R_{23}$ are tied to the bases of respective transistors $T_{21}$ (NPN) and $T_{23}$ (PNP) whose collectors are joined to the bases of two other complementary transistors $T_{22}$ and $T_{24}$ connected in cascade across wires $a$ and $b$; the collectors of these latter transistors are interconnected through a series of diodes $D_{21}$, $D_{22}$, $D_{23}$ inserted therebetween with forward polarization. The emitters of transistors $T_{21}$ and $T_{23}$ are joined to the junctions of middle diode $D_{22}$ with diodes $D_{21}$ and $D_{23}$, respectively; the last-mentioned junction is the origin of conductor $r$ which carries a reference voltage only slightly more negative than the mean of the voltages on line wires $a$ (positive) and $b$ (negative). Conductors $s$ and $t$ extend from the collectors of transistors $T_{24}$ and $T_{22}$, respectively; because of the low forward resistance of diodes $D_{21} - D_{23}$, their voltage difference is a fraction of the line voltage centered on the mean value of the latter. Thus, conductor $r$ may be regarded as a bus bar connected to virtual ground.

The transmitting network 30 includes, as a first amplifier stage, an NPN transistor $T_{31}$ which is connected across the supply conductors $s$ and $t$ in series with an emitter resistor $R_{33}$ and a collector resistor $R_{34}$; these conductors are also bridged by a voltage divider $R_{31}$, $R_{32}$ having a tap tied to the base of transistor $T_{31}$. A microphone 31 of the piezoceramic type is connected across resistor $R_{31}$.

A pair of complementary transistors $T_{32}$ (NPN) and $T_{33}$ (PNP) are connected in cascade, by way of a common emitter resistor $R_{35}$, between midpoints C and D. The bases of transistors $T_{32}$ and $T_{33}$ are respectively tied to the collector of transistor $T_{31}$ and the conductor $s$. Transistors $T_{33}$, $T_{32}$ and resistor $R_{35}$ constitute a high-impedance output circuit between conductors $c$ and $d$.

Receiving network 40 comprises, as a first stage of amplification, a differential amplifier consisting of two NPN transistors $T_{41}$, $T_{42}$ whose collectors are connected through respective resistors $R_{41}$, $R_{42}$ to wire $a$ and whose emitters are connected by way of a common NPN transistor $T_{43}$ and an emitter resistor $R_{43}$ thereof to wire $b$. The bases of transistors $T_{41}$ and $T_{42}$ are respectively tied to the diametrically opposite junctions E and F of coupling circuit 10. A control transistor $T_{44}$ of PNP type, with a base joined to reference conductor $r$, has its collector connected on the one hand to the base of transistor $T_{43}$ and on the other hand to wire $b$ via a resistor $R_{44}$. The emitter of transistor $T_{44}$ is connected to wire $a$ through a pair of parallel voltage dividers constituted by resistor pairs $R_{45}$, $R_{47}$ and $R_{46}$, $R_{48}$, an earphone 41 of the piezoceramic type being inserted between symmetrical taps of these dividers. These taps are further connected to the collectors of respective NPN transistors $T_{45}$, $T_{46}$ constituting a second-stage differential amplifier, their emitters being returned to line wire $b$ by way of a common resistor $R_{49}$. The bases of transistors $T_{45}$ and $T_{46}$ are connected to the collectors of transistors $T_{41}$ and $T_{42}$, respectively. Transducers 31 and 41 may be accommodated, in an esthetically pleasing way, in identical compact capsules. Resistors $R_{41}$–$R_{49}$ form part of a supply circuit connecting the differential amplifiers $T_{41}$, $T_{42}$ and $T_{45}$, $T_{46}$ across line $a$, $b$.

In operation, transistors $T_{32}$ and $T_{33}$ are traversed by a current whose magnitude in a quiescent state equals substantially half the maximum current which flows through these transistors upon a cutoff of input transistor $T_{31}$, saturation of the latter transistor cutting off the transistors $T_{32}$ and $T_{33}$. Thus, a 100% modulation of the current drawn across bridge diagonal C, D is obtainable by means of network 30. Even during maximum current flow, however, the resistance of the path $T_{32}$, $R_{35}$, $T_{33}$ may still be high compared to that of the bridge arms.

With control transistor $T_{44}$ saturated, its emitter potential is slightly more positive than the reference voltage on conductor $r$ so as to be substantially equal to half the line voltage. The collector potential of this transistor, in its saturated condition, is of nearly the same magnitude and is applied to the base of transistor $T_{43}$ which in turn establishes an emitter potential of the same general magnitude for the two differentially connected transistors $T_{41}$ and $T_{42}$. The voltage difference normally existing between bridge points E and F, transmitted in amplified form to the inputs of earphone 41, is modulated by incoming signals as will be readily understood. The differential-amplifier stage $T_{41}$, $T_{42}$ has a high input resistance in comparison with the resistances of the bridge arms.

Figure 3:
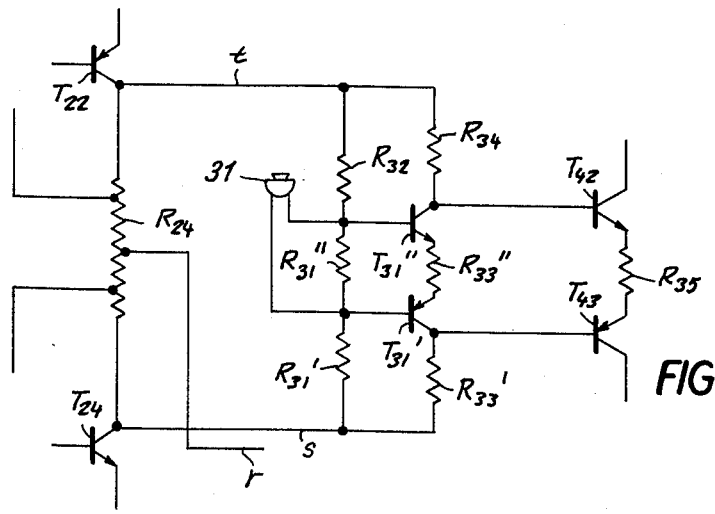
FIG. 3 is a circuit diagram showing a partial modification of the system of FIG. 2.

In FIG. 3 I have illustrated a modification of the transmitting network 30 of FIG. 2 in which the microphone 31 is connected in a balanced manner in the input of its amplifier with the aid of a voltage divider $R_{31}'$, $R_{31}''$, $R_{32}$ having symmetrical taps tied to the bases of a pair of complementary transistors $T_{31}'$ (PNP) and $T_{31}''$ (NPN) whose collectors are connected to leads $s$ and $t$ via respective resistors $R_{33}$, $R_{34}$ and whose emitters are interconnected by a resistor $R_{33}''$. The diodes $D_{21}$–$D_{23}$ of FIG. 2 have been replaced in this modified circuit by an equivalent resistor $R_{24}$ having taps connected to lead $r$ and to the collectors of transistors $T_{21}$ and $T_{23}$. The operation of this network is similar to that of network 30 in FIG. 2. Except for the piezoelectric transducers 31 and 41, the circuit elements of FIGS. 2 and 3 can be completely integrated.

Though the circuits shown in FIGS. 2 and 3 represent preferred modes of realization of the blocks 10, 20, 30 and 40 in the system of FIG. 1, it will be understood that they may be modified without departing from the spirit and scope of my invention except as otherwise limited in the appended claims.

I claim:

1. In a telecommunication system, in combination:
   a two-wire line connected to a source of d-c biasing voltage;
   a biasing network connected across said line;
   a signal-transmitting network including first amplifier means with a high-impedance output circuit;

a signal-receiving network including second amplifier means with a high-impedance input circuit and with a supply circuit connected across said line;

first conductor means connecting said biasing network to said first amplifier means for supplying thereto an operating voltage substantially balanced with respect to the line voltage;

second conductor means connecting said biasing network to said second amplifier means for supplying thereto a reference voltage substantially balanced with respect to the line voltage; and a coupling circuit connected across said line and provided with mutually conjugate pairs of terminals respectively connected across said input and output circuits.

2. The combination defined in claim 1 wherein said first amplifier means comprises a transistor stage with supply terminals connected by said first conductor means across a low-resistance intermediate section of said biasing network.

3. The combination defined in claim 2 wherein said signal-transmitting network comprises a piezoelectric microphone connected across an input of said transistor stage.

4. The combination defined in claim 2 wherein said coupling network comprises a resistance bridge with two opposite high-resistance arms and two opposite low-resistance arms forming a first diagonal connected across said line and a second diagonal connected across a matching impedance, said low-resistance arms having their midpoints connected across said high-impedance output circuit.

5. The combination defined in claim 4 wherein said high-impedance output circuit comprises a pair of complementary transistors controlled by said transistor stage and connected in cascade between said midpoints.

6. The combination defined in claim 1 wherein said second amplifier means comprises a differential-amplifier stage with a supply circuit including a control transistor connected to said second conductor means.

7. The combination defined in claim 6 wherein said signal-receiving network comprises a piezoelectric earphone connected across an output of said differential-amplifier stage.

8. The combination defined in claim 6 wherein said coupling network comprises a resistance bridge with two opposite high-resistance arms and two opposite low-resistance arms forming a first diagonal connected across said line and a second diagonal connected across a matching impedance, said high-resistance arms having their midpoints connected across said high-impedance input circuit.

9. The combination defined in claim 8 wherein said high-impedance input circuit comprises a pair of differentially interconnected transistors in series with a common transistor driven by said control transistor.

10. The combination defined in claim 1 wherein said biasing network comprises a pair of cascaded complementary transistors with collectors interconnected through a low-ohmic voltage divider, said first and second conductor means being connected to said voltage divider.

* * * * *